(12) United States Patent
Bruchmann et al.

(10) Patent No.: US 7,649,074 B2
(45) Date of Patent: Jan. 19, 2010

(54) HIGH-FUNCTIONALITY HIGHLY BRANCHED OR HYPERBRANCHED POLYCARBONATES AND THEIR PREPARATION AND USE

(75) Inventors: Bernd Bruchmann, Freinsheim (DE); Harald Schaefer, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 147 days.

(21) Appl. No.: 11/816,457

(22) PCT Filed: Feb. 23, 2006

(86) PCT No.: PCT/EP2006/060240

§ 371 (c)(1),
(2), (4) Date: Aug. 16, 2007

(87) PCT Pub. No.: WO2006/089940

PCT Pub. Date: Aug. 31, 2006

(65) Prior Publication Data
US 2008/0167430 A1  Jul. 10, 2008

(30) Foreign Application Priority Data
Feb. 25, 2005  (DE) ........................ 10 2005 009 166

(51) Int. Cl.
*C08G 64/00* (2006.01)
*C08G 63/02* (2006.01)
(52) U.S. Cl. ................... 528/196; 524/612; 525/419; 525/449; 525/452; 525/462; 528/198; 528/370
(58) Field of Classification Search ................ 524/612; 525/419, 449, 452, 462; 528/196, 198, 370
See application file for complete search history.

(56) References Cited

U.S. PATENT DOCUMENTS

| 3,305,605 | A | 2/1967 | Hostettler et al. |
| 4,255,301 | A | 3/1981 | Minagawa et al. |
| 4,533,729 | A | 8/1985 | Newland et al. |
| 4,808,691 | A | 2/1989 | Koenig et al. |
| 5,770,650 | A | 6/1998 | McGee et al. |
| 6,156,919 | A | 12/2000 | Langer et al. |
| 6,497,959 | B1 | 12/2002 | Mhetar |
| 6,646,100 | B2 | 11/2003 | Hofmann et al. |
| 6,806,345 | B2 | 10/2004 | Hofmann et al. |
| 6,818,784 | B2 | 11/2004 | Tillack et al. |
| 7,112,693 | B2 | 9/2006 | Tillack et al. |
| 2007/0037957 | A1* | 2/2007 | Bruchmann et al. ......... 528/196 |
| 2007/0213501 | A1* | 9/2007 | Bruchmann et al. ......... 528/302 |
| 2008/0312384 | A1* | 12/2008 | Bruchmann et al. ......... 525/449 |

FOREIGN PATENT DOCUMENTS

| CA | 2 554 037 | 8/2005 |
| DE | 101 30 882 | 1/2003 |
| DE | 101 38 216 | 2/2003 |
| DE | 101 47 712 | 4/2003 |
| EP | 0 292 772 | 11/1988 |
| EP | 0364052 | 4/1990 |
| EP | 0 896 013 | 2/1999 |
| EP | 1 018 504 | 7/2000 |
| FR | 2.010.777 | 2/1970 |
| WO | 98/50453 | 11/1998 |
| WO | WO03046038 | 6/2003 |
| WO | WO2004/046251 | 6/2004 |
| WO | 2005/026234 | 3/2005 |
| WO | 2005/075565 | 8/2005 |
| WO | 2006/018179 | 2/2006 |

OTHER PUBLICATIONS

Daniel H. Bolton, et al.; "Synthesis and Characterization of Hyperbranched Polycarbonates"; Macromolecules 1997; 30. pp. 1890-1896.
Becker, Gerhard W. et al.; "Polycarbonate Polyacetale Polyester Celluloseester" Carl-Hanser-Verlag, Muenchen, 1992, S. 118-119.
Volker Serini; "Polycarbonates"; Ullmann's Encyclopedia of Industrial Chemistry, 2005, pp. 1-9.
Steve P. Rannard, et al.; A Highly Selective, One-Pot Multiple-Addition Convergent Synthesis of Polycarbonate Dendrimers; J. American Chemical Society, 2000; 122; pp. 11729-11730.
Arnulf Scheel, et al., Hyperbranched Thermolabile Polycarbonates Derived from a A2+B3 Monomer System, Macromol. Symp., 2004, 210, pp. 101-110.
Paul J. Flory; "Molecular Size Distribution in Three Dimensional Polymers. VI Branched Polymers Containing A-R-B f-1 Type Units"; J. Am. Chem. Soc., 1952, vol. 74; pp. 2718-2723.
Alexander Sunder, et al.; "Controlling the Growth of Polymer Trees: Concepts and Perspectives for Hyperbranched Polymers"; Chem Eur. J. 2000, 6, No. 14; pp. 2499-2506.
D. Hoelter, et al.; "Degree of Branching in Hyperbranched Polymer"; Acta Polymer., 48, pp. 30-35 (1997).
Zeno W. Wicks Jr.; "Blocked Isocyanates"; Progress in Organic Coatings, vol. 3, 1975; pp. 73-99.
Zeno W. Wicks, Jr.; "New Developments in the Field of Blocked Isocyanates"; Progress in Organic Coatings, 9 (1981); pp. 3-28.
Douglas A. Wicks, et al.; "Blocked Isocyanates III: Part A. Mechanisms and Chemistry"; Progress in Organic Coatings 36 (1999) pp. 148-172.
Douglas A. Wicks, et al.; "Blocked Isocyanates III Part B: Uses and Applications of Blocked Isocyanates"; Progress in Organic Coatings 41 (2001); pp. 1-83.
Houben-Weyl; "Methoden Der Organischen Chemie" Band XIV/2; S. 61-70; Georg Thieme Verlag, Stuttgart, 1963.
Goldberger, Streitberger; "BASF-Handbuch Lackiertechnik"; S. 395-398; Vincentz Verlag Hannover, 2002.

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

A high-functionality, highly branched or hyperbranched polycarbonate that has a weight average molecular weight of between 3,300 and 150,000, a degree of crosslinking of less than 15%, and a degree of branching ranging from 10% to 99.9%; the polycarbonate being made by a process comprising preparing one or more condensation products (K), and intermolecularly reacting the one or more condensation products (K) to form the polycarbonate.

21 Claims, No Drawings

HIGH-FUNCTIONALITY HIGHLY BRANCHED OR HYPERBRANCHED POLYCARBONATES AND THEIR PREPARATION AND USE

CROSS-REFERENCE TO RELATED APPLICATIONS

The present application is a 35 U.S.C. § 371 National Stage patent application of International patent application PCT/EP06/060240, filed on Feb. 23, 2006, which claims priority to German patent application DE 102005009166.0, filed on Feb. 25, 2005.

DESCRIPTION

The present invention relates to high-functionality, highly branched or hyperbranched polycarbonates based on dialkyl or diaryl carbonates or phosgene, diphosgene or triphosgene and on aliphatic, aliphatic/aromatic or aromatic diols or polyols, and to their use for producing paint systems.

The high-functionality, highly branched or hyperbranched polycarbonates of the invention can be employed with advantage industrially as, among other things, adhesion promoters, thixotropic agents, flow improvers, or as building blocks for preparing polyaddition polymers or polycondensation polymers, in, for example, paints, coverings, adhesives, sealants, casting elastomers or foams.

Polycarbonates are customarily obtained from the reaction of alcohols or phenols with phosgene or from the transesterification of alcohols or phenols with dialkyl or diaryl carbonates. Of industrial significance are aromatic polycarbonates, which are prepared, for example, from bisphenols; in terms of their market volume, aliphatic polycarbonates have to date played a minor role. On these points see also Becker/Braun, Kunststoff-Handbuch vol. 3/1, "Polycarbonate, Polyacetale, Polyester, Celluloseester", Carl-Hanser-Verlag, Munich 1992, pages 118-119, and "Ullmann's Encyclopedia of Industrial Chemistry", 6th Edition, 2000 Electronic Release, Verlag Wiley-VCH.

The aromatic or aliphatic polycarbonates described in the literature are generally linear or constructed with only a low degree of branching.

For instance, U.S. Pat. No. 3,305,605 describes the use of solid linear aliphatic polycarbonates having a molar mass of more than 15 000 Da as plasticizers for polyvinyl polymers.

U.S. Pat. No. 4,255,301 describes linear cycloaliphatic polycarbonates as light stabilizers for polyesters.

Linear aliphatic polycarbonates are also used preferably for producing thermoplastics, for polyesters or for polyurethane elastomers or polyurea-urethane elastomers, for example; on these points see also EP 364052, EP 292772, EP 1018504 or DE 10130882. A characteristic of these linear polycarbonates in general is their high intrinsic viscosity.

EP-A 896 013 discloses crosslinked polycarbonates which are obtainable by reacting mixtures of diols and polyols having at least 3 OH groups with organic carbonates, phosgenes or derivatives thereof. It is preferred to use at least 40% of the diol. The publication comprises no indications whatsoever as to how, starting from the stated products, one might also prepare uncrosslinked, hyperbranched polycarbonates.

High-functionality polycarbonates of defined construction have only been known for a short time.

S. P. Rannard and N. J. Davis, J. Am. Chem. Soc. 2000, 122, 11729, describe the preparation of perfectly branched dendrimeric polycarbonates by reacting carbonylbisimidazole as phosgene analog compound with bishydroxyethylamino-2-propanol.

Syntheses forming perfect dendrimers are multistage procedures which are therefore cost-intensive and hence unsuitable for transfer to the industrial scale.

D. H. Bolton and K. L. Wooley, Macromolecules 1997, 30, 1890, describe the preparation of highly rigid, high molecular weight, hyperbranched aromatic polycarbonates by reacting 1,1,1-tris(4'-hydroxyphenyl)ethane with carbonylbisimidazole.

Hyperbranched polycarbonates can also be prepared in accordance with WO 98/50453. According to the process described therein, triols are reacted again with carbonylbisimidazole. The initial products are imidazolides, which then undergo further, intermolecular reaction to form the polycarbonates. In accordance with the method stated the polycarbonates are obtained as colorless or pale yellow, rubberlike products.

Scheel and coworkers, Macromol. Symp. 2004, 120, 101, describe the preparation of polycarbonates based on triethanolamine and carbonylbisimidazole, but this preparation leads to thermally labile products.

The aforementioned syntheses giving highly branched or hyperbranched polycarbonates have the following disadvantages:

a) the hyperbranched products are high-melting, rubberlike or thermally labile, thereby significantly restricting the possibility for subsequent processing.
b) imidazole released during the reaction must be removed from the reaction mixture, which is costly and inconvenient to accomplish.
c) the reaction products always comprise terminal imidazolide groups. These groups are labile and must be converted into hydroxyl groups, for example, via a secondary step.
d) carbonyldiimidazole is a comparatively expensive chemical, which greatly increases the feedstock costs.

It was therefore an object of the invention to provide, by means of a technically simple and economical process, aromatic, preferably aromatic/aliphatic, and more preferably aliphatic polycarbonates of high functionality which are highly branched and whose structures are readily adaptable to the requirements of the application, and which are able, by virtue of their defined construction, to combine advantageous properties, such as high functionality, high reactivity, low viscosity, and ready solubility, and to provide a process for preparing these high-functionality highly branched or hyperbranched polycarbonates, and also to provide for their use.

This object has been achieved in accordance with the invention by reaction of dialkyl or diaryl carbonates with difunctional or polyfunctional aliphatic and/or aromatic alcohols.

In one alternative embodiment of the invention, phosgene, diphosgene or triphosgene is used as starting material in lieu of the carbonates.

The present invention accordingly provides a process for preparing high-functionality, highly branched or hyperbranched polycarbonates, comprising at least the steps of:
a) preparing one or more condensation products (K) by either
(a1) reacting at least one organic carbonate (A) of general formula $RO[(CO)O]_nR$ with at least one aliphatic, aliphatic/aromatic or aromatic alcohol (B1) containing at least 3 OH groups, with elimination of alcohols ROH, R, independently at each occurrence, being a straight-chain or branched aliphatic, aromatic/aliphatic or aromatic hydrocarbon radical having 1 to 20 carbon atoms, and it also being possible for the radicals R to be joined to one another to form a ring, and n is an integer from 1 to 5 or (a2) reacting phosgene, diphosgene or triphosgene with said aliphatic, aliphatic/aromatic or aromatic alcohol (B1), with release of hydrogen chloride, and (b) intermolecularly reacting the condensation products (K) to give a high-functionality, highly branched or hyperbranched polycarbonate, the proportion of the OH groups to the phosgenes or the carbonates in the reaction mixture being chosen such that the condensation products (K) contain on average either one carbonate or carbamoyl chloride group and more than one OH group, or one OH group and more than one carbonate or carbamoyl chloride group.

The invention further provides the high-functionality, highly branched or hyperbranched polycarbonates prepared by this process, and their use.

By hyperbranched polycarbonates are meant for the purposes of this invention noncrosslinked macromolecules containing hydroxyl and carbonate or carbamoyl chloride groups, which may be both structurally and molecularly nonuniform. On the one hand they may be synthesized starting from a central molecule in the same way as for dendrimers but with the chain length of the branches lacking uniformity. On the other hand they may also be of linear construction, with functional, branched side groups, or else, as a combination of the two extremes, may include linear and branched moieties. On the definition of dendrimeric and hyperbranched polymers see also P. J. Flory, J. Am. Chem. Soc. 1952, 74, 2718 and H. Frey et al., Chem. Eur. J. 2000, 6, No. 14, 2499.

By "highly branched" and "hyperbranched" in the context of the present invention is meant that the degree of branching (DB), i.e., the average number of dendritic linkages plus the average number of end groups per molecule, is from 10% to 99.9%, preferably from 20% to 99%, more preferably 20%-95%.

By "dendrimeric" in the context of the present invention is meant that the degree of branching is 99.9%-100%. On the definition of "degree of branching" see H. Frey et al., Acta Polym. 1997, 48, 30.

It is an advantage of the present invention that the polycarbonates of the invention are uncrosslinked. "Uncrosslinked" for the purposes of this specification means that the degree of crosslinking prevailing is less than 15% by weight, more preferably less than 10% by weight, determined via the insoluble fraction of the polymer.

The insoluble fraction of the polymer was determined by four-hour extraction in a Soxhlet apparatus with the same solvent as used for the gel permeation chromatography, i.e., tetrahydrofuran, dimethylacetamide or hexafluoroisopropanol, depending on which solvent has the better solvency for the polymer, by drying of the residue at a constant weight and weighing of the residue remaining.

The invention further provides for the use of the high-functionality highly branched polycarbonates of the invention as adhesion promoters, thixotropic agents, flow assistants, or as building blocks for preparing polyaddition polymers or polycondensation polymers, in—for example—paints, coverings, adhesives, sealants, casting elastomers or foams.

Details of the invention now follow.

Starting material used can be phosgene, diphosgene or triphosgene, preferably phosgene among these, although it is preferred to use organic carbonates (A).

The radicals R of the organic carbonate (A) starting material of the general formula $RO[(CO)O]_nR$ are in each case independently of one another a straight-chain or branched aliphatic, aromatic/aliphatic (araliphatic) or aromatic hydrocarbon radical having 1 to 20 carbon atoms. The two radicals R may also be joined to one another to form a ring. The two radicals R may be identical or different; preferably they are identical. Each R is preferably an aliphatic hydrocarbon radical and more preferably a straight-chain or branched alkyl radical having 1 to 5 carbon atoms, or a substituted or unsubstituted phenyl radical.

R is a straight-chain or branched, preferably straight-chain, (cyclo)aliphatic, aromatic/aliphatic or aromatic, preferably (cyclo)aliphatic or aromatic, more preferably aliphatic hydrocarbon radical having 1 to 20 carbon atoms, preferably 1 to 12, more preferably 1 to 6, and very preferably 1 to 4 carbon atoms.

Examples thereof are methyl, ethyl, isopropyl, n-propyl, n-butyl, isobutyl, sec-butyl, tert-butyl, n-hexyl, n-heptyl, n-octyl, n-decyl, n-dodecyl, n-tetradecyl, n-hexadecyl, n-octadecyl, n-eicosyl, 2-ethylhexyl, cyclopentyl, cyclohexyl, cyclooctyl, cyclododecyl, phenyl, o- or p-tolyl or naphthyl. Preference is given to methyl, ethyl, n-butyl, and phenyl.

The radicals R can be identical or different; preferably they are identical.

The radicals R can also be joined to one another to form a ring. Examples of divalent radicals R of this kind are 1,2-ethylene, 1,2-propylene, and 1,3-propylene.

In general n is an integer from 1 to 5, preferably from 1 to 3, more preferably from 1 to 2.

The carbonates can preferably be simple carbonates of the general formula RO(CO)OR; in this case, in other words, n is 1.

Dialkyl or diaryl carbonates can be prepared for example from the reaction of aliphatic, araliphatic or aromatic alcohols, preferably monoalcohols, with phosgene. Additionally they can also be prepared by oxidative carbonylation of the alcohols or phenols by means of CO in the presence of noble metals, oxygen or $NO_x$. On preparation methods of diaryl or dialkyl carbonates see also "Ullmann's Encyclopedia of Industrial Chemistry", 6th Edition, 2000 Electronic Release, Verlag Wiley-VCH.

For the invention no significant part is played by the manner in which the carbonate has been prepared.

Examples of suitable carbonates comprise aliphatic, aromatic/aliphatic or aromatic carbonates such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, di-n-propyl carbonate, di-n-butyl carbonate, diisobutyl carbonate, dipentyl carbonate, dihexyl carbonate, dicyclohexyl carbonate, diheptyl carbonate, dioctyl carbonate, didecyl carbonate or didodecyl carbonate.

Examples of carbonates where n is greater than 1 comprise dialkyl dicarbonates, such as di(tert-butyl)dicarbonate, or dialkyl tricarbonates such as di(tert-butyl)tricarbonate.

Preference is given to using aliphatic carbonates, especially those where the radicals comprise 1 to 5 carbon atoms, such as, for example, dimethyl carbonate, diethyl carbonate, di-n-propyl carbonate, di-n-butyl carbonate or diisobutyl carbonate. One preferred aromatic carbonate is diphenyl carbonate.

The organic carbonates are reacted with at least one aliphatic or aromatic alcohol (B1) which contains at least 3 OH groups, or with mixtures of two or more different alcohols.

The alcohol (B1) can be branched or unbranched, substituted or unsubstituted, and have 3 to 26 carbon atoms. It is preferably a (cyclo)aliphatic, more preferably an aliphatic, alcohol.

Examples of compounds having at least three OH groups comprise glycerol, trimethylolmethane, trimethylolethane, trimethylolpropane, trimethylolbutane, 1,2,4-butanetriol, tris(hydroxymethyl)amine, tris(hydroxyethyl)amine, tris(hydroxypropyl)amine, pentaerythritol, diglycerol, triglycerol, polyglycerols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, sugars, such as glucose, for example, sugar derivatives, such as sorbitol, mannitol, diglycerol, threitol, erythritol, adonitol (ribitol), arabitol (lyxitol), xylitol, dulcitol (galactitol), maltitol, isomalt, polyetherols having a functionality of three or more and based on alcohols with a functionality of three or more and ethylene oxide, propylene oxide or butylene oxide or mixtures thereof, or polyesterols.

Said alcohols containing at least three OH groups may if appropriate also be alkoxylated: that is, they may have been reacted with one to 30, preferably one to 20, more preferably one to 10, and very preferably one to five molecules of ethylene oxide and/or propylene oxide and/or isobutylene oxide per hydroxy group.

In this context, glycerol, trimethylolethane, trimethylolpropane, 1,2,4-butanetriol, pentaerythritol, and polyetherols thereof based on ethylene oxide and/or propylene oxide are particularly preferred.

These polyfunctional alcohols can also be used in a mixture with difunctional alcohols (B2), with the proviso that the average OH functionality of all alcohols employed is together more than 2. Examples of suitable compounds having 2 OH groups comprise ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, 1,6-hexanediol, 1,2- or 1,3-cyclopentanediol, 1,2-, 1,3- or 1,4-cyclohexanediol, 1,1-, 1,2-, 1,3- or 1,4-cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxybiphenyl, bis(4-hydroxyphenyl)sulfide, bis(4-hydroxyphenyl)sulfone, bis(hydroxymethyl)benzene, bis(hydroxymethyl)toluene, bis(p-hydroxyphenyl)methane, bis(p-hydroxyphenyl)ethane, 2,2-bis(p-hydroxyphenyl)propane, 1,1-bis(p-hydroxyphenyl)cyclohexane, dihydroxybenzophenone, difunctional polyetherpolyols based on ethylene oxide, propylene oxide, butylene oxide or mixtures thereof, polytetrahydrofuran having a molar weight of 162 to 2000, polycaprolactone or polyesterols based on diols and dicarboxylic acids.

The diols serve to fine-tune the properties of the polycarbonate. If difunctional alcohols are used the ratio of difunctional alcohols (B2) to the at least trifunctional alcohols (B1) is laid down by the skilled worker in accordance with the desired properties of the polycarbonate. As a general rule the amount of the alcohol or alcohols (B2) is 0 to 39.9 mol % based on the total amount of all alcohols (B1) and (B2) together. Preferably the amount is 0 to 35 mol %, more preferably 0 to 25 mol %, and very preferably 0 to 10 mol %.

The alcohols (B1) and (B2) are here designated together as (B).

The reaction of phosgene, diphosgene or triphosgene with the alcohol or alcohol mixture takes place in general with elimination of hydrogen chloride; the reaction of the carbonates with the alcohol or alcohol mixture to give the high-functionality highly branched polycarbonate of the invention takes place with elimination of the monofunctional alcohol or phenol from the carbonate molecule.

The high-functionality highly branched polycarbonates formed by the process of the invention are terminated after the reaction, i.e., without further modification, with hydroxyl groups and with carbonate groups or carbamoyl chloride groups. They dissolve readily in a variety of solvents.

Examples of such solvents are aromatic and/or (cyclo)aliphatic hydrocarbons and mixtures thereof, halogenated hydrocarbons, ketones, esters and ethers.

Preference is given to aromatic hydrocarbons, (cyclo)aliphatic hydrocarbons, alkyl alkanoates, ketones, alkoxylated alkyl alkanoates, and mixtures thereof.

Particular preference is given to mono- or polyalkylated benzenes and naphthalenes, ketones, alkyl alkanoates, and alkoxylated alkyl alkanoates, and also mixtures thereof.

Preferred aromatic hydrocarbon mixtures are those which comprise predominantly aromatic $C_7$ to $C_{14}$ hydrocarbons and can comprise a boiling range of 110 to 300° C., more preferably toluene, o-, m- or p-xylene, trimethylbenzene isomers, tetramethylbenzene isomers, ethylbenzene, cumene, tetrahydronaphthalene, and mixtures comprising them.

Examples thereof are the Solvesso® grades from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® grades from Shell. Hydrocarbon mixtures made up of paraffins, cycloparaffins, and aromatics are also available commercially under the designations Kristallöl (for example, Kristallöl 30, boiling range about 158-198° C., or Kristallöl 60: CAS No. 64742-82-1), white spirit (likewise, for example CAS No. 64742-82-1) or solvent naphtha (light: boiling range about 155-180° C.; heavy: boiling range about 225-300° C.). The aromatics content of hydrocarbon mixtures of this kind is generally more than 90% by weight, preferably more than 95%, more preferably more than 98%, and very preferably more than 99% by weight. It can be sensible to use hydrocarbon mixtures having a particularly reduced naphthalene content.

The amount of aliphatic hydrocarbons is generally less than 5%, preferably less than 2.5%, and more preferably less than 1% by weight.

Halogenated hydrocarbons are, for example, chlorobenzene and dichlorobenzene or its isomer mixtures.

Esters are, for example, n-butyl acetate, ethyl acetate, 1-methoxyprop-2-yl acetate, and 2-methoxyethyl acetate.

Ethers are, for example, THF, dioxane, and the dimethyl, diethyl or di-n-butyl ethers of ethylene glycol, diethylene glycol, triethylene glycol, propylene glycol, dipropylene glycol or tripropylene glycol.

Ketones are, for example, acetone, 2-butanone, 2-pentanone, 3-pentanone, hexanone, isobutyl methyl ketone, heptanone, cyclopentanone, cyclohexanone or cycloheptanone.

(Cyclo)aliphatic hydrocarbons are, for example, decalin, alkylated decalin, and isomer mixtures of linear or branched alkanes and/or cycloalkanes.

Additionally preferred are n-butyl acetate, ethyl acetate, 1-methoxyprop-2-yl acetate, 2-methoxyethyl acetate, 2-butanone, isobutyl methyl ketone, and mixtures thereof, particularly with the aromatic hydrocarbon mixtures set out above.

Mixtures of this kind can be made up at a volume ratio of 5:1 to 1:5, preferably at a volume ratio of 4:1 to 1:4, more preferably at a volume ratio of 3:1 to 1:3, and very particularly preferably at a volume ratio of 2:1 to 1:2.

Preferred solvents are butyl acetate, methoxypropyl acetate, isobutyl methyl ketone, 2-butanone, Solvesso® grades, and xylene.

Additionally suitable for the carbonates may be, for example, water, alcohols, such as methanol, ethanol, butanol, alcohol/water mixtures, acetone, 2-butanone, dimethylformamide, dimethylacetamide, N-methylpyrrolidone, N-ethylpyrrolidone, ethylene carbonate or propylene carbonate.

By a high-functionality polycarbonate is meant in the context of this invention a product which besides the carbonate groups which form the polymer backbone has terminally or pendently in addition at least three, preferably at least six, more preferably at least ten functional groups. The functional groups are carbonate groups or carbamoyl chloride groups and/or OH groups. In principle there is no upper limit on the number of terminal or pendent functional groups; however, products having a very high number of functional groups may exhibit unwanted properties, such as high viscosity or poor solubility, for example. The high-functionality polycarbonates of the present invention generally have no more than 500 terminal or pendent functional groups, preferably not more than 100 terminal or pendent functional groups.

For the preparation of the high-functionality polycarbonates it is necessary to set the ratio of the OH-comprising compounds to phosgene or carbonate (A) such that the resultant simplest condensation product (called condensation product (K) below) comprises on average either one carbonate or carbamoyl chloride group and more than one OH group or one OH group and more than one carbonate or carbamoyl chloride group, preferably on average either one carbonate or one carbamoyl chloride group and at least two OH groups or one OH group and at least two carbonate or carbamoyl chloride groups.

It may further be sensible, for fine-tuning the properties of the polycarbonate, to use at least one divalent carbonyl-reactive compound (A1). By this are meant compounds which contain two carbonate and/or carboxyl groups.

Carboxyl groups can in this context be carboxylic acids, carbonyl chlorides, carboxylic anhydrides or carboxylic esters, preferably carboxylic anhydrides or carboxylic esters, and more preferably carboxylic esters.

If such divalent compounds (A1) are used, then the ratio of (A1) to the carbonates and/or phosgenes (A) is laid down by the skilled worker in accordance with the desired properties of the polycarbonate. As a general rule the amount of the divalent compound or compounds (A1) is 0 to 40 mol %, based on the total amount of all carbonates/phosgenes (A) and compounds (A1) together. Preferably the amount is 0 to 35 mol %, more preferably 0 to 25 mol %, and very preferably 0 to 10 mol %.

Examples of compounds (A1) are dicarbonates or dicarbamoyl chlorides of diols, examples of which are ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclo-octanediol, norbornanediol, pinanediol, decalindiol, 2-ethyl-1,3-hexanediol, 2,4-diethyl-octane-1,3-diol, hydroquinone, bisphenol A, bisphenol F, bisphenol B, bisphenol S, 2,2-bis(4-hydroxycyclohexyl)propane, 1,1-, 1,2-, 1,3- and 1,4-cyclohexanedimethanol, and 1,2-, 1,3- or 1,4-cyclohexanediol.

These compounds may be prepared, for example, by reacting said diols with an excess of, for example, the above-recited carbonates RO(CO)OR or chlorocarbonic esters, so that the dicarbonates thus obtained are substituted on both sides by groups RO(CO)—. A further possibility is to react the diols first with phosgene to give the corresponding chlorocarbonic esters of the diols, and then to react these esters with alcohols.

Further compounds (A1) are dicarboxylic acids, esters of dicarboxylic acids, preferably the methyl, ethyl, isopropyl, n-propyl, n-butyl, isobutyl, sec-butyl or tert-butyl esters, more preferably the methyl, ethyl or n-butyl esters.

Examples of dicarboxylic acids of this kind are oxalic acid, maleic acid, fumaric acid, succinic acid, glutaric acid, adipic acid, sebacic acid, dodecanedioic acid, o-phthalic acid, isophthalic acid, terephthalic acid, azelaic acid, 1,4-cyclohexanedicarboxylic acid or tetrahydrophthalic acid, suberic acid, phthalic anhydride, tetrahydrophthalic anhydride, hexahydrophthalic anhydride, tetrachlorophthalic anhydride, endomethylenetetrahydrophthalic anhydride, glutaric anhydride, dimeric fatty acids, isomers thereof and hydrogenation products thereof.

The simplest structure of the condensation product (K), illustrated using, as example, the reaction of a carbonate (A) with a dialcohol or polyalcohol (B), produces the arrangement $XY_m$ or $Y_mX$, X being a carbonate or carbamoyl group, Y a hydroxyl group, and m generally an integer greater than 1 to 6, preferably greater than 1 to 4, more preferably greater than 1 to 3. The reactive group, which results as a single group, is generally referred to below as "focal group".

Where, for example, in the preparation of the simplest condensation product (K) from a carbonate and a dihydric alcohol, the molar reaction ratio is 1:1, then the result on average is a molecule of type XY, illustrated by the general formula (I).

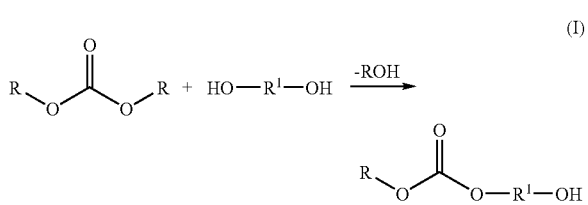

In the case of the preparation of the condensation product (K) from a carbonate and a trihydric alcohol with a molar reaction ratio of 1:1, the result on average is a molecule of type $XY_2$, illustrated by the general formula (II). The focal group here is a carbonate group.

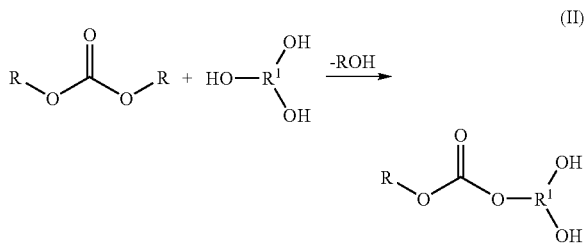

In the preparation of the condensation product (K) from a carbonate and a tetrahydric alcohol, again with the molar reaction ratio 1:1, the result on average is a molecule of type $XY_3$, illustrated by the general formula (III). The focal group here is a carbonate group.

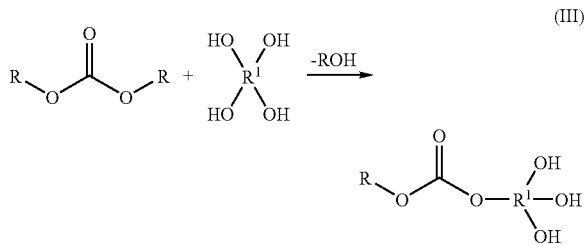

In the formulae (I) to (III) R is as defined at the outset and $R^1$ is an aliphatic or aromatic radical.

The condensation product (K) can also be prepared, for example, from a carbonate and a trihydric alcohol, illustrated by the general formula (IV), where the reaction ratio on a molar basis is 2:1. Here the result on average is a molecule of type $X_2Y$, the focal group here being an OH group. In the formula (IV) the definitions of R and $R^1$ are the same as above in formulae (I) to (III).

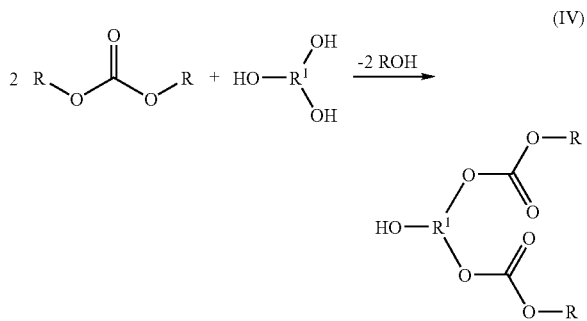

Where difunctional compounds, e.g., a dicarbonate or a diol, are additionally added to the components, this produces an extension of the chains, as illustrated for example in the general formula (V). The result again is on average a molecule of type $XY_2$, the focal group being a carbonate group.

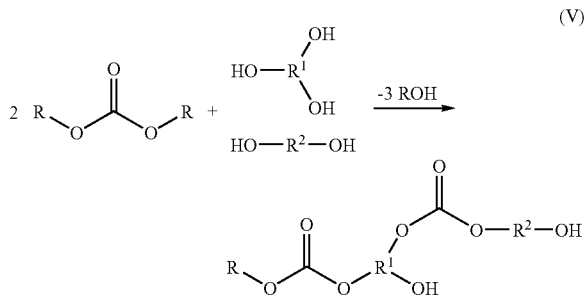

In formula (V) $R^2$ is an aliphatic or aromatic radical while R and $R^1$ are defined as described above.

It is also possible to use two or more condensation products (K) for the synthesis. In this case it is possible on the one hand to use two or more alcohols and/or two or more carbonates.

Furthermore, through the choice of the ratio of the alcohols and carbonates or phosgenes used, it is possible to obtain mixtures of different condensation products with different structure. This may be exemplified taking, as example, the reaction of a carbonate with a trihydric alcohol. If the starting products are used in a 1:1 ratio, as depicted in (II), a molecule $XY_2$ is obtained. If the starting products are used in a 2:1 ratio, as illustrated in (IV), the result is a molecule $X_2Y$. With a ratio between 1:1 and 2:1 a mixture of molecules $XY_2$ and $X_2Y$ is obtained.

Typical reaction conditions for the reaction of (A) with (B) to form a condensation product (K) are set out below:

The stoichiometry of components (A) and (B) is generally chosen such that the resultant condensation product (K) contains either one carbonate or carbamoyl chloride group and more than one OH group, or one OH group and more than one carbonate or carbamoyl chloride group. This is achieved in the first case by a stoichiometry of 1 mol of carbonate groups: >2 mol of OH groups, for example, a stoichiometry of 1:2.1 to 8, preferably 1:2.2 to 6, more preferably 1:2.5 to 4, and very preferably 1:2.8 to 3.5.

In the second case it is achieved by a stoichiometry of more than 1 mol of carbonate groups: <1 mol of OH groups, for example, a stoichiometry of 1:0.1 to 0.48, preferably 1:0.15 to 0.45, more preferably 1:0.25 to 0.4, and very preferably 1:0.28 to 0.35.

The temperature ought to be sufficient for the reaction of the alcohol with the corresponding carbonyl component. For the reaction with a phosgene a temperature from −20° C. to 120° C., preferably 0 to 100° C., and more preferably 20 to 80° C., is generally sufficient. When a carbonate is used the temperature should be 60 to 180° C., preferably 80 to 160° C., more preferably 100 to 160° C., and very preferably 120 to 140° C.

Suitable solvents are those already set out above. A preferred embodiment is to carry out the reaction without solvent.

The order in which the individual components is added is generally of minor importance. As a general rule it is sensible to introduce the excess component of the two reaction partners first and to add the deficit component. Alternatively it is likewise possible to mix the two components with one another before the beginning of reaction and then to heat this mixture to the requisite reaction temperature.

The simple condensation products (K) described exemplarily in formulae (I)-(V) react in accordance with the invention preferably intermolecularly to form high-functionality polycondensation products, referred to below as polycondensation products (P). The reaction to give the condensation product (K) and to give the polycondensation product (P) takes place usually at a temperature of 0 to 300° C., preferably 0 to 250° C., more preferably at 60 to 200° C., and very preferably at 60 to 160° C., in bulk (without solvent) or in solution. In this context it is possible generally to use any solvents which are inert toward the respective reactants. Preference is given to using organic solvents, such as those mentioned above, for example, and more preferably decane, dodecane, benzene, toluene, chlorobenzene, xylene, dimethylformamide, dimethylacetamide or solvent naphtha.

In one preferred embodiment the condensation reaction is carried out in bulk. The monofunctional alcohol or the phenol which is liberated during the reaction, ROH, can be removed from the reaction equilibrium in order to accelerate the reaction, such removal taking place, for example, by distillative means, if appropriate under reduced pressure.

The separation of the alcohol or phenol can also be assisted by passing through the reaction mixture a stream of gas which is substantially inert under the reaction conditions (i.e., stripping), such as, for example, nitrogen, steam, carbon dioxide, or else by passing through the mixture an oxygen-containing gas, such as atmospheric air or lean air, for example.

If distillative removal is intended, it is advisable as a general rule to use carbonates which during the reaction give off alcohols or phenols ROH having a boiling point of less than 140° C. under the prevailing pressure.

To accelerate the reaction it is also possible to add catalysts or catalyst mixtures. Suitable catalysts are compounds which catalyze esterification or transesterification reactions, examples being alkali metal hydroxides, alkali metal carbonates, alkali metal hydrogen carbonates, preferably of sodium, of potassium or of cesium, tertiary amines, guanidines, ammonium compounds, phosphonium compounds, organoaluminum, organotin, organozinc, organotitanium, organozirconium or organobismuth compounds, and also catalysts of the kind known as double metal cyanide (DMC) catalysts, as described, for example, in DE 10138216 or in DE 10147712.

Preference is given to using potassium hydroxide, potassium carbonate, potassium hydrogen carbonate, diazabicyclooctane (DABCO), diazabicyclononene (DBN), diazabicycloundecene (DBU), imidazoles, such as imidazole, 1-methylimidazole or 1,2-dimethylimidazole, titanium tetrabutoxide, titanium tetraisopropoxide, dibutyltin oxide, dibutyltin dilaurate, tin dioctoate, zirconium acetylacetonate, or mixtures thereof.

The catalyst is generally added in an amount of 50 to 10 000 ppm by weight, preferably of 100 to 5000 ppm by weight, based on the amount of alcohol or alcohol mixture employed.

Furthermore it is also possible, either by adding the appropriate catalyst and/or by choosing a suitable temperature, to control the intermolecular polycondensation reaction. In addition the average molecular weight of the polymer (P) can be adjusted via the composition of the starting components and via the residence time.

The condensation products (K) and the polycondensation products (P), which have been prepared at an elevated temperature, are stable at room temperature usually for a relatively long period of time, for example, for at least 6 weeks, without displaying turbidities, precipitations and/or any increase in viscosity.

In view of the nature of the condensation products (K) it is possible that the condensation reaction may result in polycondensation products (P) having different structures, with branches but no crosslinks. Furthermore, the polycondensation products (P) ideally contain either a carbonate or carbamoyl chloride focal group and more than two OH groups, or else an OH focal group and more than two carbonate or carbamoyl chloride groups. The number of reactive groups depends on the nature of the condensation products (K) employed and on the degree of polycondensation.

For example, a condensation product (K) of the general formula (II) may react by triple intermolecular condensation to form two different polycondensation products (P), which are reproduced in general formulae (VI) and (VII).

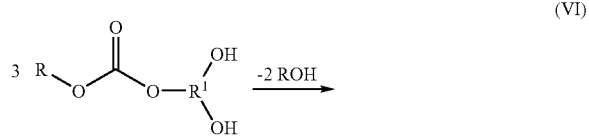

(VI)

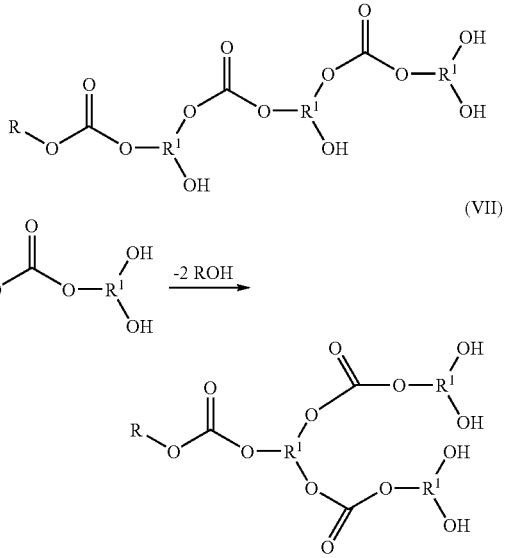

(VII)

R and R$^1$ in formulae (VI) and (VII) are as defined above.

To terminate the intermolecular polycondensation reaction there are a variety of possibilities. By way of example the temperature can be lowered to a range in which the reaction comes to a standstill and the product (K) or the polycondensation product (P) is stable on storage. This is generally the case at below 60° C., preferably below 50° C., more preferably below 40° C., and very preferably at room temperature.

Furthermore, the catalyst can be deactivated: in the case of basic catalysts, for example, by adding an acidic component, a Lewis acid for example, or an organic or inorganic protic acid.

A further possibility is to arrest the reaction by dilution with a precooled solvent. This is particularly preferred when it is necessary to adapt the viscosity of the reaction mixture by adding solvent.

The high-functionality highly branched or hyperbranched polycarbonates of the invention generally have a glass transition temperature of less than 50° C., preferably less than 30° C., and more preferably less than 10° C.

The OH number is generally 100 mg KOH/g or more, preferably 150 mg KOH/g or more.

The weight-average molar weight $M_w$ is generally between 1000 and 150 000, preferably from 2000 to 120 000 g/mol, the number-average molar weight $M_n$ between 500 and 50 000, preferably between 1000 and 40 000 g/mol.

In a further embodiment, as soon as the intermolecular reaction of the condensation product (K) gives a polycondensation product (P) having the desired degree of polycondensation, the reaction can be arrested by adding to the product (P) a product having groups that are reactive toward the focal group of (P).

For instance, in the case of a carbonate or carbamoyl focal group, a mono-, di- or polyamine, for example, can be added.

In the case of a hydroxyl focal group, the product (P) can have added to it, for example, a mono-, di- or polyisocyanate, a compound comprising epoxide groups, or an acid derivative which is reactive with OH groups.

The high-functionality polycarbonates of the invention are generally prepared in a pressure range from 0.1 mbar to 20 bar, preferably 1 mbar to 5 bar, in reactors or reactor cascades which are operated batchwise, semibatchwise or continuously.

As a result of the aforementioned setting of the reaction conditions and, if appropriate, as a result of the choice of suitable solvent, the products of the invention can be processed further following preparation, without additional purification.

If necessary, the reaction mixture can be subjected to decoloring, by means for example of treatment with activated carbon or metal oxides, such as alumina, silica, magnesium oxide, zirconium oxide, boron oxide or mixtures thereof, in amounts for example of 0.1%-50%, preferably 0.5% to 25%, more preferably 1%-10%, by weight, at temperatures of, for example, 10 to 100° C., preferably 20 to 80° C., and more preferably 30 to 60° C.

If appropriate it is also possible to filter the reaction mixture in order to remove any precipitates present.

In a further preferred embodiment the product is stripped, i.e., freed from volatile compounds of low molecular weight. For this purpose, after the desired degree of conversion has been reached, the catalyst can be optionally deactivated and the volatile constituents of low molecular weight, such as monoalcohols, phenols, carbonates, hydrogen chloride or volatile oligomeric or cyclic compounds, can be removed by distillation, if appropriate accompanied by introduction of a gas, preferable nitrogen, carbon dioxide or air, if appropriate under reduced pressure.

In a further preferred embodiment the polycarbonates of the invention may comprise not only the functional groups already comprised by virtue of the reaction but also further functional groups. Functionalization can in this case take place during the buildup of molecular weight or else subsequently, i.e., after the end of the actual polycondensation.

If, before or during the buildup of molecular weight, components are added which besides hydroxyl or carbonate groups possess further functional groups or functional elements, then a polycarbonate polymer is obtained which has randomly distributed functionalities different from the carbonate or carbamoyl chloride and hydroxyl groups.

Effects of this kind can be achieved for example by adding, during the polycondensation, compounds which in addition to hydroxyl, carbonate or carbamoyl chloride groups carry further functional groups or functional elements, such as mercapto groups, primary, secondary or tertiary amino groups, ether groups, carboxylic acid groups or derivatives thereof, sulfonic acid groups or derivatives thereof, phosphonic acid groups or derivatives thereof, silane groups, siloxane groups, aryl radicals or long-chain alkyl radicals.

For modification by means of carbamate groups it is possible for example to use ethanolamine, propanolamine, isopropanolamine, 2-(butylamino)ethanol, 2-(cyclohexylamino)ethanol, 2-amino-1-butanol, 2-(2'-aminoethoxy) ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

For modification with mercapto groups it is possible to use mercaptoethanol for example. Tertiary amino groups can be generated, for example, by incorporation of triethanolamine, tripropanolamine, N-methyldiethanolamine, N-methyldipropanolamine or N,N-dimethylethanolamine. Ether groups can be generated, for example, by incorporating polyetherols having a functionality of two or more during condensation. By adding dicarboxylic acids, tricarboxylic acids, dicarboxylic esters, such as dimethyl terephthalate, or tricarboxylic esters it is possible to generate ester groups. Reaction with long-chain alkanols or alkanediols enables long-chain alkyl radicals to be incorporated. Reaction with alkyl or aryl diisocyanates generates polycarbonates containing alkyl, aryl, and urethane groups, while addition of primary or secondary amines results in the incorporation of urethane or urea groups.

Subsequent functionalization can be obtained by reacting the resultant high-functionality highly branched or hyperbranched polycarbonate in an additional process step (step c)) with a suitable functionalizing reagent that is able to react with the polycarbonate's OH and/or carbonate or carbamoyl chloride groups.

High-functionality, highly branched or hyperbranched polycarbonates comprising hydroxyl groups can be modified, for example, by adding molecules comprising acid groups or isocyanate groups. Polycarbonates comprising acid groups, for example, can be obtained by reaction with compounds comprising anhydride groups.

Additionally, high-functionality polycarbonates comprising hydroxyl groups can also be converted into high-functionality polycarbonate-polyetherpolyols by reaction with alkylene oxides, ethylene oxide, propylene oxide or butylene oxide for example.

This may be sensible in order, for example, to increase the solubility in water or to produce emulsifiability in water. For these purposes the hydroxyl groups are reacted with at least one alkylene oxide, such as ethylene oxide, propylene oxide, isobutylene oxide and/or styrene oxide, preferably ethylene oxide and/or propylene oxide, and more preferably ethylene oxide. For this purpose, for each hydroxyl group, 1 to 200, preferably 2 to 200, more preferably 5 to 100, very preferably 10 to 100, and in particular 20 to 50 alkylene oxide units are employed.

In one preferred embodiment of the present invention the polycarbonates of the invention are reacted at least partly with at least one monofunctional polyalkylene oxide polyether alcohol. This produces improved emulsifiability in water.

Monofunctional polyalkylene oxide polyether alcohols are reaction products of suitable starter molecules with polyalkylene oxides.

Suitable starter molecules for preparing monohydric polyalkylene oxide polyether alcohols are thiol compounds, monohydroxy compounds of the general formula

$R^5$—O—H or secondary monoamines of the general formula

$R^6R^7N$—H, in which $R^5$, $R^6$, and $R^7$ independently of one another are independently of one another in each case $C_1$-$C_{18}$ alkyl, $C_2$-$C_{18}$ alkyl interrupted if appropriate by one or more oxygen and/or sulfur atoms and/or by one or more substituted or unsubstituted imino groups, $C_6$-$C_{12}$ aryl, $C_5$-$C_{12}$ cycloalkyl or a five- to six-membered heterocycle containing oxygen, nitrogen and/or sulfur atoms, or $R^6$ and $R^7$ together form an unsaturated, saturated or aromatic ring which is interrupted if appropriate by one or more oxygen and/or sulfur atoms and/or by one or more substituted or unsubstituted imino groups, it being possible for each of said radicals to be substituted by functional groups, aryl, alkyl, aryloxy, alkyloxy, halogen, heteroatoms and/or heterocycles.

Preferably $R^5$, $R^6$, and $R^7$ independently of one another are $C_1$ to $C_4$ alkyl, i.e., methyl, ethyl, isopropyl, n-propyl, n-butyl, isobutyl, sec-butyl or tert-butyl, and more preferably $R^5$, $R^6$, and $R^7$ are methyl.

Examples of suitable monohydric starter molecules may be saturated monoalcohols such as methanol, ethanol, n-propanol, isopropanol, n-butanol, isobutanol, sec-butanol, the isomeric pentanols, hexanols, octanols, and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Examples of the polyethers prepared starting from amines are the products known as Jeffamine® M series, which are methyl-capped polyalkylene oxides containing an amino function, such as M-600 (XTJ-505), with a propylene oxide (PO)/ethylene oxide (EO) ratio of approximately 9:1 and a molar mass of about 600, M-1000 (XTJ-506): PO/EO ratio 3:19, molar mass approximately 1000, M-2005 (XTJ-507): PO/EO ratio 29:6, molar mass approximately 2000 or M-2070:PO/EO ratio 10:31, molar mass approximately 2000.

Alkylene oxides suitable for the alkoxylation reaction are ethylene oxide, propylene oxide, isobutylene oxide, vinyloxirane and/or styrene oxide, which may be used in any order or else in a mixture for the alkoxylation reaction.

Preferred alkylene oxides are ethylene oxide, propylene oxide, and mixtures thereof; ethylene oxide is particularly preferred.

Preferred polyether alcohols are those based on polyalkylene oxide polyether alcohols prepared using saturated aliphatic or cycloaliphatic alcohols of the abovementioned kind as starter molecules. Very particular preference is given to those based on polyalkylene oxide polyether alcohols which have been prepared using saturated aliphatic alcohols having 1 to 4 carbon atoms in the alkyl radical. Particular preference is given to polyalkylene oxide polyether alcohols prepared starting from methanol.

The monohydric polyalkylene oxide polyether alcohols contain on average in general at least 2 alkylene oxide units, preferably 5 ethylene oxide units, per molecule, more preferably at least 7, very preferably at least 10, and in particular at least 15.

The monohydric polyalkylene oxide polyether alcohols contain on average in general up to 50 alkylene oxide units, preferably ethylene oxide units, per molecule, preferably up to 45, more preferably up to 40, and very preferably up to 30.

The molar weight of the monohydric polyalkylene oxide polyether alcohols is preferably up to 4000, more preferably not above 2000 g/mol, very preferably not below 500, and in particular 1000±200 g/mol.

Preferred polyether alcohols are therefore compounds of the formula

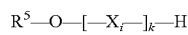

in which $R^5$ is as defined above, k is an integer from 5 to 40, preferably 7 to 45, and more preferably 10 to 40, and each $X_1$ for i=1 to k can be selected independently of the others from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group consisting of —$CH_2$—$CH_2$—O—, —$CH_2$—$CH(CH_3)$—O—, and —$CH(CH_3)$—$CH_2$—O—, and more preferably —$CH_2$—$CH_2$—O— where Ph is phenyl and Vin is vinyl.

To carry out the reaction of the polycarbonates the polycarbonates (K) and/or (P) are reacted with one another at temperatures of 40 to 180° C., preferably 50 to 150° C., observing a carbonate or carbamoyl chloride/OH equivalent ratio of 1:1 to 100:1, preferably of 1:1 to 50:1, more preferably 1.5:1 to 20:1.

A great advantage of the process of the invention lies in its economy. Both the reaction to form a condensation product (K) or polycondensation product (P) and the reaction of (K) or (P) to form polycarbonates with other functional groups or elements can take place in one reaction apparatus, which is an advantage both technically and economically.

The high-functionality, highly branched or hyperbranched polycarbonates obtained in accordance with the process of the invention can be employed for example as adhesion promoters, thixotropic agents, flow improvers, or as building blocks for preparing polyaddition polymers or polycondensation polymers, for example, as components for producing paints, coverings, adhesives, sealants, casting elastomers or foams, and also as a constituent of binders, if appropriate with other components such as, for example, isocyanates, epoxygroup-comprising binders or alkyd resins, in adhesives, printing inks, coatings, foams, coverings, and paints.

In a further preferred embodiment of the present invention the polycarbonates of the invention can be used as flow assistants for improving the rheology of coating materials, such as that of clearcoat and topcoat materials, for example.

The polyesters of the invention can be employed as binder components, in coating compositions for example, together if appropriate with other hydroxyl- or amino-containing binders, for example, with hydroxy(meth)acrylates, hydroxystyryl (meth)acrylates, linear or branched polyesters, polyethers, polycarbonates, melamine resins or urea-formaldehyde resins, together with compounds that are reactive toward carboxyl and/or hydroxyl functions, for example, with isocyanates, capped isocyanates, epoxides and/or amino resins, preferably isocyanates, epoxides or amino resins, more preferably with isocyanates or epoxides, and very preferably with isocyanates.

Isocyanates are for example aliphatic, aromatic and cycloaliphatic di- and polyisocyanates having an average NCO functionality of at least 1.8, preferably from 1.8 to 5 and more preferably from 2 to 4, and also their isocyanurates, oxadiazine-triones, iminooxadiazinediones, ureas, biurets, amides, urethanes, allophanates, carbodiimides, uretonimines, and uretdiones.

The diisocyanates are preferably isocyanates having 4 to 20 carbon atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetra-decamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also aromatic diisocyanates such as 2,4- or 2,6-tolylene diisocyanate and isomer mixtures thereof, m- or p-xylylene diisocyanate, 2,4'- or 4,4'-diisocyanatodiphenylmethane and isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Suitable polyisocyanates include polyisocyanates containing isocyanurate groups, uretdione diisocyanates, polyisocyanates containing biuret groups, polyisocyanates containing amide groups, polyisocyanates containing urethane or allophanate groups, polyisocyanates comprising oxadiazinetrione groups or iminooxadiazinedione groups, carbodiimide- or uretonimine-modified polyisocyanates of linear or branched $C_4$-$C_{20}$ alkylene diisocyanates, cycloaliphatic diisocyanates having a total of 6 to 20 carbon atoms or aromatic diisocyanates having a total of 8 to 20 carbon atoms, or mixtures thereof.

The di- and polyisocyanates which can be employed preferably have an isocyanate group content (calculated as NCO, molecular weight=42) of from 1% to 60% by weight, based on the diisocyanate and polyisocyanate (mixture), preferably from 2% to 60% by weight, and more preferably from 10% to 55% by weight.

Preference is given to aliphatic and/or cycloaliphatic di- and polyisocyanates, examples being the abovementioned aliphatic and/or cycloaliphatic diisocyanates, or mixtures thereof.

Particular preference is given to hexamethylene diisocyanate, 1,3-bis(isocyanatomethyl)cyclohexane, isophorone diisocyanate, and di(isocyanatocyclohexyl)methane, very particular preference to isophorone diisocyanate and hexamethylene diisocyanate, and especial preference to hexamethylene diisocyanate.

Preference extends to

1) Isocyanurate-group-containing polyisocyanates of aromatic, aliphatic and/or cycloaliphatic diisocyanates. Particular preference here goes to the corresponding aliphatic and/or cycloaliphatic isocyanato-isocyanurates and, in particular, to those based on hexamethylene diisocyanate and isophorone diisocyanate. The present isocyanurates are, in particular, tris-isocyanatoalkyl and/or tris-isocyanatocycloalkyl isocyanurates, which represent cyclic trimers of the diisocyanates, or are mixtures with their higher homologs containing more than one isocyanurate ring. The isocyanato-isocyanurates generally have an NCO content of from 10% to 30% by weight, in particular from 15% to 25% by weight, and an average NCO functionality of from 2.6 to 4.5.

2) Uretdione diisocyanates containing aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used in the formulations of the invention as a sole component or in a mixture with other polyisocyanates, especially those mentioned under 1).

3) Polyisocyanates containing biuret groups and aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of from 18% to 23% by weight and an average NCO functionality of from 2.8 to 4.5.

4) Polyisocyanates containing urethane and/or allophanate groups and aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with monohydric or polyhydric alcohols such as for example methanol, ethanol, isopropanol, n-propanol, n-butanol, isobutanol, sec-butanol, tert-butanol, n-pentanol, n-hexanol, n-heptanol, n-octanol, n-decanol, n-dodecanol (lauryl alcohol), 2-ethylhexanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol or polyhydric alcohols as listed above for the polyesterols, or mixtures thereof. These polyisocyanates containing urethane and/or allophanate groups generally have an NCO content of from 12% to 20% by weight and an average NCO functionality of from 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups can be prepared from diisocyanate and carbon dioxide.

6) Polyisocyanates comprising iminooxadiazinedione groups, preferably derived from hexamethylene diisocyanate or isophorone diisocyanate. Polyisocyanates of this kind comprising iminooxadiazinedione groups are preparable from diisocyanates by means of specific catalysts.

7) Carbodiimide-modified and/or uretonimine-modified polyisocyanates.

The polyisocyanates 1) to 7) can be used in a mixture, including if appropriate in a mixture with diisocyanates.

The isocyanate groups of the di- or polyisocyanates may also be in capped form. Examples of suitable blocking agents for NCO groups include oximes, phenols, imidazoles, pyrazoles, pyrazolinones, triazoles, diketopiperazines, caprolactam, malonic esters or compounds as specified in the publications by Z. W. Wicks, Prog. Org. Coat. 3 (1975) 73-99 and Prog. Org. Coat 9 (1981), 3-28, by D. A. Wicks and Z. W. Wicks, Prog. Org. Coat. 36 (1999), 148-172 and Prog. Org. Coat, 41 (2001), 1-83 and also in Houben-Weyl, Methoden der Organischen Chemie, Vol. XIV/2, 61 ff. Georg Thieme Verlag, Stuttgart 1963.

By blocking or capping agents are meant compounds which transform isocyanate groups into blocked (capped or protected) isocyanate groups, which then, below a temperature known as the deblocking temperature, do not display the usual reactions of a free isocyanate group. Compounds of this kind with blocked isocyanate groups are commonly employed in dual-cure coating materials or in powder coating materials which are cured to completion via isocyanate curing.

Epoxide compounds are those having at least one, preferably at least two, more preferably from two to ten epoxide group(s) in the molecule.

Suitable examples include epoxidized olefins, glycidyl esters (e.g., glycidyl (meth)acrylate) of saturated or unsaturated carboxylic acids or glycidyl ethers of aliphatic or aromatic polyols. Products of this kind are available commercially in large numbers. Particular preference is given to polyglycidyl compounds of the bisphenol A, F or B type and to glycidyl ethers of polyfunctional alcohols, such as that of butanediol, of 1,6-hexanediol, of glycerol and of pentaerythritol. Examples of polyepoxide compounds of this kind are Epikote® 812 (epoxide value: about 0.67 mol/100 g) and Epikote® 828 (epoxide value: about 0.53 mol/100 g), Epikote® 1001, Epikote® 1007 and Epikote® 162 (epoxide value: about 0.61 mol/100 g) from Resolution, Rütapox® 0162 (epoxide value: about 0.58 mol/100 g), Rütapox® 0164 (epoxide value: about 0.53 mol/100 g) and Rütapox® 0165 (epoxide value: about 0.48 mol/100 g) from Bakelite AG, and Araldit® DY 0397 (epoxide value: about 0.83 mol/100 g) from Vantico AG.

Suitability is further possessed by compounds containing active methylol or alkylalkoxy groups, especially methylalkoxy groups, such as etherified reaction products of formaldehyde with amines, such as melamine, urea, etc., phenol/formaldehyde adducts, siloxane or silane groups and anhydrides, as described for example in U.S. Pat. No. 5,770,650.

Among the preferred amino resins, which are known and widespread industrially, particular preference goes to using urea resins and melamine resins, such as urea-formaldehyde resins, melamine-formaldehyde resins, melamine-phenol-formaldehyde resins or melamine-urea-formaldehyde resins.

Suitable urea resins are those which are obtainable by reacting ureas with aldehydes and which if appropriate may be modified.

Suitable ureas are urea, N-substituted or N,N'-disubstituted ureas, such as N-methylurea, N-phenylurea, N,N'-dimethylurea, hexamethylenediurea, N,N'-diphenylurea, 1,2-ethylenediurea, 1,3-propylenediurea, diethylenetriurea, dipropylenetriurea, 2-hydroxypropylenediurea, 2-imidazolidinone (ethyleneurea), 2-oxohexahydro-pyrimidine (propyleneurea) or 2-oxo-5-hydroxyhexahydropyrimidine (5-hydroxy-propyleneurea).

Urea resins can if appropriate be partly or fully modified, by reaction for example with mono- or polyfunctional alcohols, ammonia and/or amines (cationically modified urea resins) or with (hydrogen)sulfites (anionically modified urea resins), particular suitability being possessed by the alcohol-modified urea resins.

Suitable alcohols for the modification are $C_1$-$C_6$ alcohols, preferably $C_1$-$C_4$ alcohol, and especially methanol, ethanol, isopropanol, n-propanol, n-butanol, isobutanol and sec-butanol.

Suitable melamine resins are those which are obtainable by reacting melamine with aldehydes and which if appropriate may be fully or partly modified.

Particularly suitable aldehydes are formaldehyde, acetaldehyde, isobutyraldehyde, and glyoxal.

Melamine-formaldehyde resins are reaction products from the reaction of melamine with aldehydes, examples being the abovementioned aldehydes, especially formaldehyde. If appropriate the resulting methylol groups are modified by etherification with the abovementioned monohydric or polyhydric alcohols. Additionally the melamine-formaldehyde resins may also be modified as described above by reaction with amines, aminocarboxylic acids or sulfites.

The action of formaldehyde on mixtures of melamine and urea or on mixtures of melamine and phenol produces, respectively, melamine-urea-formaldehyde resins and melamine-phenol-formaldehyde resins which can likewise be used in accordance with the invention.

The stated amino resins are prepared by conventional methods.

Examples cited in particular are melamine-formaldehyde resins, including monomeric or polymeric melamine resins and partly or fully alkylated melamine resins, urea resins, e.g., methylolureas such as formaldehyde-urea resins, alkoxyureas such as butylated formaldehyde-urea resins, but also N-methylolacrylamide emulsions, isobutoxymethylacrylamide emulsions, polyanhydrides, such as polysuccinic anhydride, and siloxanes or silanes, such as dimethyldimethoxysilanes, for example.

Particular preference is given to amino resins such as melamine-formaldehyde resins or formaldehyde-urea resins.

In addition it is also possible for hydroxyl-containing polycarbonates of the invention to be at least partly esterified or transesterified with α,β-ethylenically unsaturated carboxylic acids or derivatives thereof, examples being (meth)acrylic acid or (meth)acrylic esters, thus forming carbonates of the hydroxyl-containing polyesters with the α,β-ethylenically unsaturated carboxylic acids, which can be employed, for example, as monomers or crosslinkers in radiation-curable coating compositions.

The coating materials in which the polycarbonates of the invention can be employed as binders may be conventional basecoats, aqueous basecoats, substantially solvent-free and water-free liquid basecoats (100% systems), substantially solvent-free and water-free solid basecoats (powder coating materials, including pigmented powder coating materials) or substantially solvent-free powder coating dispersions, pigmented if appropriate (powder slurry basecoats). They may be thermally curable, radiation-curable or dual-cure systems, and may be self-crosslinking or externally crosslinking.

The coating compositions of the invention are especially suitable for coating substrates such as wood, paper, textile, leather, nonwoven, plastics surfaces, glass, ceramic, mineral building materials, such as cement moldings and fiber-cement slabs, and especially metals or coated metals.

Coating is normally carried out by conventionally coating with the coating compositions of the invention, then drying to remove any solvent present, and curing.

The substrates are coated by customary methods known to the skilled worker, involving the application of at least one coating composition of the invention to the substrate that is to be coated, in the desired thickness, and the removal of the volatile constituents. This operation can be repeated one or more times if desired. Application to the substrate may take place in a known way, by means, for example, of spraying, troweling, knifecoating, brushing, rolling, roller coating or pouring, for example. The coating thickness is generally in a range from about 3 to 1000 g/m² and preferably 10 to 200 g/m².

The high-functionality highly branched polycarbonates formed by the process of the invention are terminated after the reaction—that is, without further modification—by hydroxyl groups and/or by carbonate or carbamoyl chloride groups. They dissolve readily in various solvents, for example, in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

The present invention will be illustrated with reference to the examples below.

General Working Instructions:

The polyfunctional alcohol or the alcohol mixture, the carbonate, other monomers if appropriate, and potassium carbonate catalyst (amount based on amount of alcohol in % by weight) were charged in accordance with the batching quantities as per table 1 to a three-necked flask equipped with stirrer, reflux condenser, and internal thermometer, the mixture was heated to 140° C., and stirring was carried out at this temperature for 2 h. As the reaction period progressed there was a reduction in the temperature of the reaction mixture, owing to the ensuing evaporative cooling of the monoalcohol released. The reflux condenser was then swapped for a descending condenser, one equivalent (based on the equivalent amount of catalyst) of a phosphoric acid was added, the monoalcohol was removed by distillation, and the temperature of the reaction mixture was slowly raised to up to 160° C. The alcohol removed by distillation was collected in a cooled round-bottomed flask, weighed, and the conversion thus determined on a percentage basis in relation to the full conversion theoretically possible (see table 1).

Subsequently, at 160° C. over a period of 1 h, dry nitrogen was passed through the reaction mixture in order to remove any residues of monomers still present. Thereafter the reaction mixture was cooled to room temperature.

The products were either introduced in pure form into the coating formulations or else diluted with butyl acetate. Details of this are found in tables 2, 4, and 5.

TABLE 1

Starting materials and end products

| Ex. No. | Alcohol or alcohol mixture | Carbonate or carbonate + other monomers | Molar ratio alcohol:carbonate:any other monomer | Catalyst, % by weight based on amount of alcohol | Distillate, amount of alcohol based on full conversion mol % | Molecular weight of product (g/mol) Mw Mn | Glass transition temperature Tg (° C.) | OH number of product (mg KOH/g) to DIN 53240, part 2 |
|---|---|---|---|---|---|---|---|---|
| 1 | TMP × 1.2 PO | DEC | 1:1 | $K_2CO_3$ 0.15 | 72 | 2100 1450 | n.d. | 400 |
| 2 | TMP × 12 EO | DEC | 1:1 | $K_2CO_3$ 0.15 | 70 | 5300 2800 | n.d. | 180 |
| 3 | TMP × 3 EO | DEC + TDME | 1:0.8 DEC:0.2 TDME | $K_2CO_3$ 0.15 | 78 | 7700 3500 | −20.7 | 275 |
| 4 | TMP × 3 EO | DEC + TDME | 1:0.6 DEC:0.4 TDME | $K_2CO_3$ 0.15 | 90 | 4200 2500 | −21.2 | 320 |
| 5 | TMP × 3 EO | DEC + TDME | 1:0.5 DEC:0.5 TDME | $K_2CO_3$ 0.15 | 90 | 4900 2800 | −22.8 | 296 |
| 6 | TMP × 1.2 PO + IPDC 4:1 molar | DEC | 0.8:0.2:1 | $K_2CO_3$ 0.5 | 90 | 4100 1900 | −13.9 | 291 |
| 7 | TMP × 1.2 PO + IPDC 3:2 molar | DEC | 0.6:0.4:1 | $K_2CO_3$ 0.5 | 90 | 4800 2000 | 7.6 | 227 |
| 8 | TMP × 1.2 PO + IPDC 1:1 molar | DEC | 0.5:0.5:1 | $K_2CO_3$ 0.5 | 90 | 3300 1600 | 8.5 | 223 |
| 9 | TMP × 3 EO + IPDC 4:1 molar | DEC | 0.8:0.2:1 | $K_2CO_3$ 0.4 | 90 | 10200 3200 | −32.4 | 218 |
| 10 | TMP × 3 EO + IPDC 3:2 molar | DEC | 0.6:0.4:1 | $K_2CO_3$ 0.4 | 82 | 10700 3000 | −18.5 | 175 |
| 11 | TMP × 3 EO + IPDC 1:1 molar | DEC | 0.5:0.5:1 | $K_2CO_3$ 0.4 | 84 | 7500 2000 | −11.7 | 167 |

TMP = Trimethylolpropane
EO = Ethylene oxide
PO = Propylene oxide
DEC = Diethyl carbonate
TDME = Dimethyl terephthalate
IPDC = 2,2-Isopropylidenedicyclobexanol (hydrogenated bisphenol A)
The designation "TMP × 3 EO" describes in the table a product reacted with on average 3 mol of ethylene oxide per mole of trimethylolpropane.
n.d. = not determined Analysis of the Inventive Products:

The polycarbonates were analyzed by gel permeation chromatography using a refractometer detector. The mobile phase used was dimethylacetamide, and the standard used for determining the molecular weight was polymethyl methacrylate (PMMA).

The glass transition temperatures were determined by differential scanning calorimetry (DSC), with the second heating curve being the one evaluated.

The OH number was determined in accordance with DIN 53240, part 2.

Preparation of the Paints:

All paint mixtures were made up with a stoichiometric ratio of isocyanate groups to alcohol groups (index 100) at room temperature.

The viscosity was adjusted using butyl acetate to a flow time of 20 s in accordance with ISO 2431 and EN 535 in the DIN 4 cup. The paints were knife-coated at room temperature onto a sheet metal substrate, using a box-type coating bar, to give a wet film thickness of 180 μm. The paint film thickness after drying was on average approximately 40 μm.

The comparative examples considered were paints obtained from commercial raw materials.

Test Methods:

The paint properties were investigated after 24-hour storage of the painted metal sheets in a controlled-climate room at 23° C. and 50% relative humidity.

All of the paints investigated were clear and transparent after curing at 130° C.

Nonvolatiles content (NVC): 1 g of the paint mixture was dried in a forced-air oven at 125° C. for an hour and the residual weight was determined, based on the initial value (=100%).

Flow time: Measured on the basis of ISO 2431 and EN 535 in the DIN 4 cup at room temperature. The result reported is the time from the beginning of flow to the breaking of the string of liquid, in seconds.

König pendulum damping in number of swings, based on DIN EN ISO 1522.

Erichsen cupping: Cupping test in accordance with DIN EN ISO 1520, in mm of cupping.

Adhesion with cross-cut in accordance with DIN 53151; a rating of 0 denotes the best score, a rating of 5 the worst score. In this regard, see also Goldberg and Streitberger, BASF Handbuch Lackiertechnik, Vincentz-Verlag Hannover, 2002, page 395.

Acetone double-rub test: An acetone-soaked cotton pad was rubbed in back-and-forth strokes by hand until the paint coat had been rubbed through down to the sheet metal. The number of double rubs required to achieve this is reported. At one hundred rubs the test was terminated.

Etch test with 1% strength sulfuric acid: Using a pipette, 25-μm drops were applied to a gradient oven sheet, which was heated in the gradient oven at 30-75° C. for 30 minutes. The metal sheet was subsequently washed off with water and dried. The result reported is the lowest temperature at which incipient etching was still observable to the eye.

Result of the Paint Investigations at the 130° C. Cure Temperature

In general the use of the hyperbranched polycarbonates results in an increase in the nonvolatiles content, an improvement in the elasticity with comparable hardness, and an improvement in the cross-cut adhesion (see tables 3, 6 and 7). In addition there is an improvement in the scratch resistance of the surface and in the resistance of the paints to chemicals and to acids (see table 3).

TABLE 2

Starting materials and amounts

| Starting materials (parts by weight) | Example 12 (comparative) | Example 13 | Example 14 | Example 15 | Example 16 |
|---|---|---|---|---|---|
| Macrynal ® SM 636 | 53.7 | 45.0 | 41.9 | 48.8 | 51.5 |
| Polycarbonate from example 1 | | 3.5 | | | |
| Polycarbonate from example 2 | | | 7.4 | 1.9 | 0.9 |
| Vestanat ® T 1890 L | 32.0 | 35.8 | 33.3 | 34.2 | 33.0 |
| Butyl acetate | 41.0 | 37.0 | 36.0 | 38.0 | 38.0 |
| Nonvolatiles content (NVC, %) | 47.4 | 49.5 | 50.7 | 48.7 | 48.6 |
| Flow time (s) | 20 | 20 | 20 | 20 | 20 |

Macrynal® SM 636, UCB, polyacrylate polyol, 70% in butyl acetate, OH number approximately 135 mg KOH/g Vestanat® T 1890 L: Polyisocyanate from Degussa based on the isocyanurate of isophorone diisocyanate, functionality between 3 and 4, 70% strength solution in n-butyl acetate/Solvesso 100 1:2

Basonat® HI 100: Polyisocyanate from BASF based on the isocyanurate of hexamethylene 1,6-diisocyanate, functionality between 3 and 4

TABLE 3

Products from table 2, characteristics of the paints. The paints were cured at 130° C. for 30 minutes

| | Example 12 (comparative) | Example 13 | Example 14 | Example 15 | Example 16 |
|---|---|---|---|---|---|
| Film thickness (μm) | 36 | 42 | 39 | 43 | 38 |
| Pendulum damping | 148 | 148 | 145 | 148 | 150 |
| Erichsen cupping (mm) | 3.0 | 4.0 | 8.5 | 7.9 | 8.5 |
| Cross-cut | 5 | 5 | 3 | 5 | 4 |
| Acetone test | >100 | >100 | >100 | >100 | >100 |
| Etching test, testing after 24 h | 61 | 62 | n.d. | n.d. | 66 |

TABLE 4

Starting materials and amounts

| Starting materials (parts by weight) | Example 17 (comparative) | Example 18 | Example 19 | Example 20 | Example 21 |
|---|---|---|---|---|---|
| Macrynal ® SM 636 | 60.0 | 45.0 | 45.0 | 45.0 | 45.0 |
| Polycarbonate from example 3 (90% in butyl acetate) | | 5.7 | | | |
| Polycarbonate from example 4 (90% in butyl acetate) | | | 4.9 | | |
| Polycarbonate from example 5 (90% in butyl acetate) | | | | 5.3 | |
| Polycarbonate from example 6 (70% in butyl acetate) | | | | | 7.0 |
| Vestanat ® T 1890 L | 26.5 | 26.5 | 26.5 | 26.5 | 26.5 |
| Basonat ® HI 100 | 4.8 | 4.8 | 4.8 | 4.8 | 4.8 |
| Butyl acetate | 41.0 | 37.0 | 36.0 | 38.0 | 38.0 |
| Nonvolatiles content (NVC, %) | 47.6% | 49.0% | 48.9% | 49.1% | 48.9% |
| Flow time (s) | 20 | 20 | 20 | 20 | 20 |

TABLE 5

Starting materials and amounts

| Starting materials (parts by weight) | Example 22 | Example 23 | Example 24 | Example 25 | Example 26 |
|---|---|---|---|---|---|
| Macrynal ® SM 636 | 45.0 | 45.0 | 45.0 | 45.0 | 45.0 |
| Polycarbonate from example 7 (70% in butyl acetate) | 8.9 | | | | |
| Polycarbonate from example 8 (70% in butyl acetate) | | 9.1 | | | |
| Polycarbonate from example 9 (70% in butyl acetate) | | | 9.3 | | |
| Polycarbonate from example 10 (70% in butyl acetate) | | | | 11.6 | |
| Polycarbonate from example 11 (70% in butyl acetate) | | | | | 12.1 |
| Vestanat ® T 1890 L | 26.5 | 26.5 | 26.5 | 26.5 | 26.5 |
| Basonat ® HI 100 | 4.8 | 4.8 | 4.8 | 4.8 | 4.8 |
| Butyl acetate | 39.5 | 39.5 | 39.5 | 41.0 | 40.5 |
| Nonvolatiles content (NVC, %) | 49.0% | 49.0% | 49.1% | 48.9% | 49.1% |
| Flow time (s) | 20 | 20 | 20 | 20 | 20 |

TABLE 6

Products from table 4, characteristics of the paints.
The paints were cured at 130° C. for 30 minutes

| | Example 17 (comparative) | Example 18 | Example 19 | Example 20 | Example 21 |
|---|---|---|---|---|---|
| Film thickness (μm) | 35 | 39 | 38 | 37 | 35 |
| Pendulum damping | 149 | 150 | 150 | 148 | 153 |
| Erichsen cupping (mm) | 5.8 | 6.7 | 6.3 | 6.1 | 6.2 |
| Cross-cut | 4 | 3.5 | 1 | 2.5 | 4 |
| Acetone test | >100 | >100 | >100 | >100 | >100 |

TABLE 7

Products from table 5, characteristics of the paints. The paints were cured at 130° C. for 30 minutes, the reference being example 17 from table 6

| | Example 22 | Example 23 | Example 24 | Example 25 | Example 26 |
|---|---|---|---|---|---|
| Film thickness (μm) | 39 | 35 | 38 | 36 | 35 |
| Pendulum damping | 146 | 151 | 150 | 146 | 152 |
| Erichsen cupping (mm) | 5.9 | 7.1 | 7.5 | 7.3 | 7.6 |
| Cross-cut | 4 | 1.5 | 4 | 2.5 | 1 |
| Acetone test | >100 | >100 | >100 | >100 | >100 |

The invention claimed is:

1. A high-functionality, highly branched or hyperbranched polycarbonate produced by a process comprising
 a) preparing one or more condensation products (K) by
  (a1) reacting at least one aliphatic organic carbonate (A) of general formula $RO[(CO)O]_nR$ with at least one aliphatic alcohol (B1) comprising at least 3 OH groups, with elimination of alcohols ROH, R, independently at each occurrence, being a straight-chain or branched aliphatic hydrocarbon radical having 1 to 20 carbon atoms, and it also being possible for the radicals R to be joined to one another to form a ring, and n is an integer from 1 to 5, or
  (a2) reacting phosgene, diphosgene or triphosgene with said at least one aliphatic alcohol (B1), with release of hydrogen chloride, and
 b) intermolecularly reacting the one or more condensation products (K) to produce the high-functionality, highly branched or hyperbranched polycarbonate,
 wherein the proportion of the OH groups to the phosgenes or the aliphatic carbonates in the reaction mixture being chosen such that the condensation products (K) contain on average either one carbonate or carbamoyl chloride group and more than one OH group, or one OH group and more than one carbonate or carbamoyl chloride group,
 wherein the high-functionality, highly branched or hyperbranched polycarbonate has a weight average molecular weight $M_w$ of between 3,300 and 150,000 g/mol,
 wherein the degree of crosslinking of the high-functionality, highly branched or hyperbranched polycarbonate is less than 15%, and
 wherein the degree of branching of the high-functionality, highly branched or hyperbranched polycarbonate ranges from 10% to 99.9%.

2. The high-functionality, highly branched or hyperbranched polycarbonate of claim 1, wherein the high-functionality, highly branched or hyperbranched polycarbonate has a glass transition temperature of less than 50° C.

3. A composition comprising the high-functionality, highly branched or hyperbranched polycarbonate of claim 1, wherein said composition is selected from the group consisting of a paint, a covering, an adhesive, a sealant, and a casting foam.

4. The high-functionality, highly branched or hyperbranched polycarbonate produced by the process according to claim 1, wherein the high-functionality, highly branched or hyperbranched polycarbonate has a weight-average molar weight $M_w$ of between 4,100 and 150,000 g/mol.

5. The high-functionality, highly branched or hyperbranched polycarbonate of claim 1, wherein the high-functionality, highly branched or hyperbranched polycarbonate further comprises in addition to the at least one aliphatic alcohol (B1) as a high-functionality, highly branched or hyperbranched polycarbonate component, at least one difunctional aliphatic alcohol (B2) as a high-functionality, highly branched or hyperbranched polycarbonate component.

6. The high-functionality, highly branched or hyperbranched polycarbonate of claim 5, wherein the amount of the at least one difunctional alcohol (B2) ranges from a positive amount greater than 0 to 39.9 mol %, based on the total amount of all alcohols present in the polycarbonate.

7. A coating composition comprising the high-functionality, highly branched or hyperbranched polycarbonate of claim 1 and at least one material selected from the group consisting of a nonblocked isocyanated, a blocked isocyanate, an epoxy-group-comprising binder, an alkyd resin, and combinations thereof.

8. A method of coating a substrate, the method comprising applying the coating composition according to claim 7 to a substrate to produce a coated substrate,
 drying the coated substrate to produce a dried coated substrate, and
 curing the dried coated substrate.

9. A water-emulsifiable high-functionality, highly branched or hyperbranched polycarbonate produced by a process comprising
reacting the high-functionality, highly branched or hyperbranched polycarbonate of claim 1 with at least one monofunctional polyalkylene oxide polyether alcohol.

10. A high-functionality, highly branched or hyperbranched polycarbonate produced by a process comprising
a) preparing one or more condensation products (K) by
(a1) reacting at least one aliphatic organic carbonate (A) of general formula $RO[(CO)O]_nR$ with at least one alkoxylated aliphatic alcohol (B1) comprising at least 3 OH groups, with elimination of alcohols ROH, R, independently at each occurrence, being a straight-chain or branched aliphatic hydrocarbon radical having 1 to 20 carbon atoms, and it also being possible for the radicals R to be joined to one another to form a ring, and n is an integer from 1 to 5, or
(a2) reacting phosgene, diphosgene or triphosgene with said at least one alkoxylated aliphatic alcohol (B1), with release of hydrogen chloride, and
b) intermolecularly reacting the one or more condensation products (K) to produce the high-functionality, highly branched or hyperbranched polycarbonate,
wherein the proportion of the OH groups to the phosgenes or the aliphatic carbonates in the reaction mixture being chosen such that the condensation products (K) contain on average either one carbonate or carbamoyl chloride group and more than one OH group, or one OH group and more than one carbonate or carbamoyl chloride group,
wherein the high-functionality, highly branched or hyperbranched polycarbonate has a weight average molecular weight $M_w$ of between 3,300 and 150,000 g/mol,
wherein the degree of crosslinking of the high-functionality, highly branched or hyperbranched polycarbonate is less than 15%, and
wherein the degree of branching of the high-functionality, highly branched or hyperbranched polycarbonate ranges from 10% to 99.9%.

11. The high-functionality, highly branched or hyperbranched polycarbonate of claim 10, wherein the at least one alkoxylated aliphatic alcohol (B1) is prepared by a process comprising
reacting an aliphatic alcohol selected from the group consisting of a linear aliphatic alcohol having at least 3 OH groups, a branched aliphatic alcohol having at least three OH groups, and a (cyclo)aliphatic alcohol having at least 3 OH groups with an oxide to produce the at least one alkoxylated aliphatic alcohol (B1).

12. The high-functionality, highly branched or hyperbranched polycarbonate of claim 10, wherein the at least one alkoxylated aliphatic alcohol (B1) is prepared by a process comprising
reacting an aliphatic alcohol is selected from the group consisting of glycerol, trimethylolethane, trimethylolpropane, 1,2,4-butanetriol, pentaerythritol, and combinations thereof, with an oxide selected from the group consisting of ethylene oxide, propylene oxide, isobutylene oxide, and combinations thereof, to form the at least one alkoxylated aliphatic alcohol (B1).

13. The high-functionality, highly branched or hyperbranched polycarbonate of claim 10, wherein the at least one alkoxylated aliphatic alcohol (B1) is prepared by a process comprising
reacting trimethylolpropane with propylene oxide to produce the at least one alkoxylated aliphatic alcohol (B1).

14. The high-functionality, highly branched or hyperbranched polycarbonate of claim 10, wherein the at least one alkoxylated aliphatic alcohol (B1) is prepared by a process comprising
reacting trimethylolpropane with ethylene oxide to produce the at least one alkoxylated aliphatic alcohol (B1).

15. The high-functionality, highly branched or hyperbranched polycarbonate of claim 13,
wherein the high-functionality, highly branched or hyperbranched polycarbonate further comprises in addition to the at least one alkoxylated aliphatic alcohol (B1) as a high-functionality, highly branched or hyperbranched polycarbonate component, at least one difunctional alcohol (B2) as a high-functionality, highly branched or hyperbranched polycarbonate component.

16. The high-functionality, highly branched or hyperbranched polycarbonate of claim 15, wherein the at least one difunctional alcohol (B2) is 2,2-isopropylidenedicyclohexanol (hydrogenated bisphenol A).

17. The high-functionality, highly branched or hyperbranched polycarbonate of claim 14,
wherein the high-functionality, highly branched or hyperbranched polycarbonate further comprises in addition to the at least one alkoxylated aliphatic alcohol (B1) as a high-functionality, highly branched or hyperbranched polycarbonate component, at least one difunctional alcohol (B2) as a high-functionality, highly branched or hyperbranched polycarbonate component.

18. The high-functionality, highly branched or hyperbranched polycarbonate of claim 17, wherein the at least one difunctional alcohol (B2) is 2,2-isopropylidenedicyclohexanol (hydrogenated bisphenol A).

19. A composition comprising the high-functionality, highly branched or hyperbranched polycarbonate of claim 1 and a catalyst.

20. The composition of claim 19, wherein the catalyst is potassium carbonate.

21. The high-functionality, highly branched or hyperbranched polycarbonate of claim 1, wherein the process for preparing the highly branched or hyperbranched polycarbonate of claim 1 comprises the
a) preparing one or more condensation products (K) by
(a1) reacting at least one aliphatic organic carbonate (A) of general formula $RO[(CO)O]_nR$ with at least one aliphatic alcohol (B1) comprising at least 3 OH groups,
wherein the at least one organic carbonate (A) of general formula $RO[(CO)O]_nR$ is diethyl carbonate.

* * * * *